United States Patent Office 3,284,480
Patented Nov. 8, 1966

3,284,480
STABILIZATION OF ORGANIC ISOCYANATES WITH ORGANIC ALDOXIMES
David T. Manning, South Charleston, W. Va., assignor to Union Carbide Corporation, a corporation of New York
No Drawing. Filed May 9, 1963, Ser. No. 279,338
10 Claims. (Cl. 260—453)

This invention relates to isocyanate compositions, particularly an isocyanate composition stabilized from discoloration.

Isocyanates are typically colorless liquids or solids which are found to discolor on storage. Discoloration of isocyanates deleteriously affects their saleability typically because the color may be transferred to the product in which the isocyanate is employed. This is particularly so in the case of polyisocyanates used in resin manufacture.

It is herein described an agent which significantly retards discoloration of the isocyanate product thus allowing storage of the isocyanate for reasonable periods of time prior to use. These agents are particularly effective when employed in solution with the isocyanate.

The agents employed in this invention for retarding discoloration of organic isocyanates are aldoximes, that is, organic compounds bearing the —CH=NOH group.

These aldoximes may be characterized by the formula:

(I)        R—CH=NOH wherein R may be groups such as alkyl, aryl, haloalkyl, acylalkyl, aroylalkyl, acyloxyalkyl, aroyloxyalkyl, cycloalkyl, aralkyl, cyanoalkyl, alkenyl, alkoxycarbonylalkyl, aryloxycarbonylalkyl, and the like.

Illustrative alkyl groups include those of 1 to 12 carbon atoms, such as methyl, ethyl, n-propyl, i-propyl, n-butyl, t-butyl, n-pentyl, n-hexyl, n-octyl, n-nonyl, 2-n-propylhexyl, n-decyl, n-undecyl, n-dodecyl, and the like. The resulting aldoximes include acetaldoxime, propionaldoxime, n-butyraldoxime, i-butyraldoxime, pentanaldoxime, 2,2-dimethylpropionaldoxime, hexanaldoxime, heptanaldoxime, 2-ethylheptanaldoxime, 4-propylhexanaldoxime, 3,3,5-trimethylhexanaldoxime, octanaldoxime, nonanaldoxime, decanaldoxime, 3-n-propylheptanaldoxime, undecanaldoxime, dodecanaldoxime, and the like.

Illustrative aryl groups include phenyl, alpha-naphthyl, beta-naphthyl and phenanthryl. The corresponding aldoximes include benzaldoxime, alpha-naphthaldoxime, beta-naphthaldoxime and phenanthraldoxime.

Illustrative haloalkyl groups include those of the formula:

(II)  

wherein $n$ is an integer of from 1 to 10, R′, R″, R‴ and R‴′ can be hydrogen or the alkyl groups described above; and X is halogen such as chlorine, bromine, fluorine, and the like. Examples of haloalkyl groups encompassed by Formula II include 3-chloropropyl, 4-fluorobutyl, 5-bromopentyl, 6-chlorohexyl, 7-fluoroheptyl, 12-chlorododecyl, 3-chloro-1-methylpropyl, 5-fluoro-1-propylpentyl, 7-bromo-1-butylheptyl, 9-chloro-1-ethylnonyl, 12-chloro-1-i-propyldodecyl, 3-chloro-1,1-diethylpropyl, 5-chloro-1-t-butyl-1-methylpentyl, 7-bromo-1-ethyl-1-propylheptyl, 9-fluoro-1,1-dipropylnonyl, and 12-bromo-1-hexyl-1-methyldodecyl, 4 - chloro-4-methylhexyl, 5-ethyl-5-fluoro-6-methylheptyl and 8-bromo-10-t-butylundecyl, and the like. The resulting aldoximes include 4-chlorobutyraldoxime, 5-fluoropentanaldoxime, 6-bromohexanaldoxime, 7-chloroheptanaldoxime, 8-fluorooctanaldoxime, 13-chlorotridecanaldoxime, 4-chloro-2-methylbutyraldoxime, 6-fluoro-2 - propylhaxanaldoxime, 8-bromo-2-butyloctanaldoxime, 10 - chloro-2-ethyldecanaldoxime, 13-chloro-2-i-propyltridecanaldoxime, 4-chloro - 2,2 - diethylbutyraldoxime, 6-chloro-2-t-butyl - 2 - methylhexanaldoxime, 8-bromo-2-ethyl - 2 - propyloctanaldoxime, 10 - fluoro-2,2-dipropyldecanaldoxime, and 13-bromo-2-hexyl-2-methyltridecanaldoxime, 5 - chloro-5-methylheptanaldoxime, 6-ethyl-6-fluoro - 7 - methyloctanaldoxime and 9-bromo-11-t-butyldodecanaldoxime, and the like.

Illustrative of the acylalkyl and aroylalkyl groups are those of the formula (III)  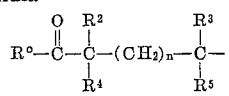

wherein $n$ is an integer of from 1 to 10, $R^0$ can be alkyl, cycloalkyl, haloalkyl, aryl or aralkyl, and $R^2$, $R^3$, $R^4$ and $R^5$ can be hydrogen or $R^0$. Examples of groups encompassed by Formula III include 3-(4-chlorobutyryl)propyl, 5-acetylpentyl, 7-benzoylheptyl, 9-phenylacetylnonyl, 11-propionylundecyl, 1-ethyl-1-methyl - 3 - acetylpropyl, 5-benzoyl - 1-butylpentyl, 7-i-butyryl-1-methyl-1-propylheptyl, 9-(4-chlorovaleryl) - 1,1 - dimethylnonyl, 1-butyl-1-methyl-12-phenylacetyldodecyl, 4-acetyl-4-ethyl-4-methylbutyl, 6-phenyl-6-propionylhexyl, 9-benzoyl-9,9-dimethylnonyl, 11-methyl-11-phenylacetylundecanyl, and the like. The resulting aldoximes include 4-(4-chlorobutyryl)butyraldoxime, 6 - acetylhexanaldoxime, 8-benzoyloctanaldoxime 10-phenylacetyldecanaldoxime, 12-propionyldodecanaldoxime, 2-ethyl-2-methyl-4-acetylbutyraldoxime, 6-benzoyl-2-butylhexanaldoxime, 8-i-butyryl-2-methyl-2-propyloctanaldoxime, 10 - (4-chlorovaleryl)-2,2-dimethyldecanaldoxime, 2-butyl-2-methyl-13-phenylacetyltridecanaldoxime, 5-acetyl - 5 - methylheptanaldoxime, 7-phenyl-7-propionylheptanaldoxime, 10 - benzoyl-10-methylundecanaldoxime, 12-phenylacetyltridecanaldoxime, and the like.

Illustrative acyloxyalkyl and aroyloxyalkyl groups include those of the formula:

(IV)  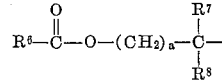

wherein $a$ is an integer of from 2 to 11, $R^6$ is the same as $R^0$, described above, and $R^7$ and $R^8$ can be hydrogen or $R^6$. Examples of groups encompassed by Formula IV include 3-propionoxypropyl, 5-benzoyloxypentyl, 7-butyroxyheptyl, and 12-acetoxydodecyl, 4-propionoxy-1-methyl-1-propylbutyl, 6-benzoyloxy-1-ethylhexyl, 8-butyroxy-1-butyl-1-methyloctyl, 11-acetoxy - 1 - benzyl - 1 - ethylundecyl, and the like. The aldoximes include 4-propionoxybutyraldoxime, 6-benzoyloxyhexanaldoxime, 8-butyroxyoctanaldoxime, and 13-acetoxytridecanaldoxime, 5-propionoxy-2-methyl-2-propylpentanaldoxime, 7 - benzoyloxy-2-ethylheptanaldoxime, 9-butyroxy-2-butyl-2-methylnonanaldoxime, 12 - acetoxy-2-benzyl-2-ethyldodecanaldoxime, and the like.

The aforementioned cycloalkyl groups are preferably those containing from 5 to 7 carbon atoms in the ring, such as cyclopentyl, cyclohexyl and cycloheptyl. The resulting aldoximes include cyclopentanecarboxaldoxime, cyclohexanecarboxaldoxime, cycloheptanecarboxaldoxime, and the like.

The aralkyl group may be one of a variety of radicals encompassed by the term aralkyl, and desirably, the group is represented by those encompassed by the formula (V)   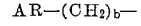

wherein $b$ is an integer of from 1 to 10, and AR can be an aryl group such as phenyl, alpha-naphthyl, beta-naphthyl, phenanthryl, anthryl, and the like. Specific aralkyl groups encompassed by Formula V include: benzyl, 2-phenylethyl, 6-alpha-naphthylhexyl, 8-beta-naphthyloctyl, 10-phenyldecyl, and the like. The resulting aldoximes include benzaldoxime, 3-phenylpropanaldoxime, 7-alpha-naphthylheptanaldoxime, 9 - beta - naphthylnonanaldoxime, 11-phenylundecanaldoxime, and the like.

The cyanoalkyl groups referred to previously are typically those encompassed by the formula (VI) 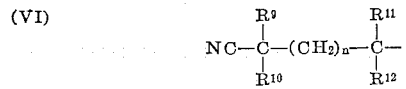

wherein $n$ is as described above, and $R^9$, $R^{10}$, $R^{11}$ and $R^{12}$ can be hydrogen or groups such as alkyl, cycloalkyl, haloalkyl, aryl or aralkyl. Illustrations of groups encompassed by Formula VI include 3-cyanopropyl, 5-cyanopentyl, 7-cyanoheptyl, 9-cyanononyl, 11-cyanoundecyl, 12-cyanododecyl, 3-cyano-1-ethyl-1-methylpropyl, 6-cyano-1-butylhexyl, 9-cyano-1-butyl-1-methylnonyl and 11 - cyano - 1-ethyl-1-hexylundecyl, 3-cyano-3-ethyl-3-methylpropyl, 5-cyano-5-methylpentyl, 7-cyano-7-butyl-7-cyclohexylheptyl, 9-cyano-9,9-diethylnonyl, and the like. Aldoximes containing groups illustrated by Formula VI include e.g., 4-cyanobutyraldoxime, 6 - cyanohexanaldoxime, 8 - cyanooctanaldoxime, 10-cyanodecanaldoxime, 12-cyanododecanaldoxime, 13-cyanotridecanaldoxime, 4-cyano-2-ethyl-2-methylbutyraldoxime, 7-cyano-2-butylheptanaldoxime, 10-cyano-2-butyl-2-methyldecanaldoxime, 12-cyano-2 - ethyl-2-hexyldodecanaldoxime, 4-cyano-4-methylhexanaldoxime, 6-cyanoheptanaldoxime, 8-cyano-8 - cyclohexyldodecanaldoxime, 10-cyano-10-ethylodecanaldoxime, and the like.

The alkenyl groups referred to previously typically contain from 2 to about 10 carbon atoms and from 1 to 2 ethylenic moieties

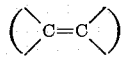

per group. Illustrative alkenyl groups include vinyl, propenyl, allyl, 1-methylvinyl, 1-cyclohexylvinyl, 2-methylpropenyl, 1-methyl-2-phenylvinyl, 2-phenylvinyl, 1-hexenyl, 1,3-pentadienyl, 3-cyclohexenyl, and the like. The resulting alkenyl aldoxime may be e.g., acrolein oxime, crotonaldoxime, vinylacetaldoxime, methacrolein oxime, cyclohexylacrolein oxime, 3 - methylcrotonaldoxime, 2-methylcinnamaldoxime, cinnamaldoxime, 2 - heptenaldoxime, sorbaldoxime, 3-cyclohexencarboxaldoxime, and the like.

The alkoxycarbonylalkyl groups referred to above, are typically characterized by the formula:

(VII) 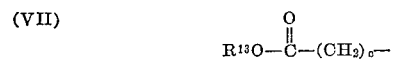

wherein $c$ is an integer of from 3 to 12 and $R^{13}$ is the same as described for $R^\circ$. Formula VII characterizes such groups as 3-ethoxycarbonylheptyl, 5-benzyloxycarbonylpentyl, 7-cyclohexyloxycarbonylheptyl, 12-propoxycarbonyldodecyl, and the like. Aldoximes bearing the groups characterized by Formula VII include e.g., 4-ethoxycarbonylbutyraldoxime, 6 - benzyloxycarbonylhexanaldoxime, 8-cyclohexyloxycarbonyloctanaldoxime, 13 - propoxycarbonyltridecanaldoxime, and the like.

The isocyanates which may be treated to retard discoloration are organic mono- and polyisocyanates, such as aliphatic, cycloaliphatic and aromatic mono-, di-, tri- and/or other polyisocyanates which tend to discolor under conditions of moisture and temperature typically associated with industrial storage procedures. Illustrative of organic isocyanates which are beneficially stabilized from discoloration include the following:

tolylene-2,4- and 2,6-diisocyanate,
4,4'-methylenedi-o-tolylisocyanate,
2,4,4'-triisocyanatodiphenylether,
toluene-2,4,6-triisocyanate,
1-methoxy-2,4,6-triisocyanatobenzene,
m-phenylenediisocyanate,
4-chloro-m-phenylenediisocyanate,
4,4'-biphenyldiisocyanate,
1,5-naphthalenediisocyanate,
1,4-tetramethylenediisocyanate,
1,6-hexamethylenediisocyanate,
1,10-decamethylenediisocyanate,
1,4-cyclohexanediisocyanate,
1,2-ethylenediisocyanate,
4,4'-methylenediphenylisocyanate,
bis(4-isocyanatocyclohexyl)methane,
stilbene diisocyanates,
dixylylmethane diisocyanates,
2,2-bis(p-isocyanatophenyl)propane,
diphenylmethane tetraisocyanate,
trimethylbenzene triisocyanates,
phenyltolylmethane triisocyanates,
ditolylmethane triisocyanates,
triphenylmethane triisocyanates,
3,3'-dimethyldiphenylene-4,4'-diisocyanate,
3,3'-dimethoxyldiphenylene-4,4'-diisocyanate,
diphenyl triisocyanates and
isomers of bis(p,p'-isocyanatophenyl)cyclohexane.

The aforementioned color retardation agents (color stabilizing agents) should be capable of dissolution in the particular isocyanate to be stabilized regardless of whether the isocyanate is a liquid at ambient temperature or must be warmed to transform it to the liquid state. It is apparent that the agent should be stable at the temperature of the isocyanate at the time of incorporation and incorporation be effected at a temperature below that of decomposition or of any undesirable reaction of the isocyanate with itself or the agent. The agent, or mixtures of the agents, should be employed in the isocyanate in any amount sufficient to retard discoloration. Usually that amount falls between 0.005 and 5 percent by weight of the isocyanate. Preferably, the agent is employed in amounts from about 0.01 to 1.0 percent by weight of isocyanate. In general, this invention is directed to employing an amount of the agent sufficient to retard discoloration of the isocyanate.

The following serves to specifically illustrate operation of this invention, however, it is not intended to limit the scope of this invention.

*Example I*

A dry 8-ounce glass bottle is purged with dry nitrogen and charged with a mixture of 130 grams of substantially colorless, pure, freshly-distilled tolylene diisocyanate (80 weight percent 2,4-tolylene diisocyanate and 20 weight percent 2,6-tolylene diisocyanate) and 0.13 gram of acetaldoxime. The resulting composition is blanketed under dry nitrogen and the bottle is securely sealed by wrapping its stopper with tape. A similar sample is prepared, but without the added acetaldoxime, for use as a blank.

Both the blank and the acetaldoxime test samples are stored in the dark at room temperature, about 25° C. Examination after storage for four days reveals the development of a definite yellow color in the blank while the sample containing acetaldoxime remains unchanged. After 14 days, the sample containing acetaldoxime exhibits significantly less coloring than the blank sample.

*Example II*

When the procedure of Example I is repeated except that 0.13 gram of benzaldoxime is substituted for the acetaldoxime, the benzaldoxime-containing sample exhibits significantly less yellowing than the blank sample after a 14-day storage period.

*Example III*

When the procedure of Example I is repeated except that 0.13 gram of n-heptaldoxime is substituted for the acetaldoxime, the n-heptaldoxime-containing sample exhibits significantly less yellowing than the blank sample after an 8-day storage period.

The same results are obtained when n-butyraldoxime and iso-butyraldoxime are employed.

Example IV

When the procedure of Example I is repeated except that 0.13 gram of sorbaldoxime (2,4-hexandienaldoxime) is substituted for the acetaldoxime, the sorbaldoxime-containing sample exihibits significantly less yellowing than the blank sample after a 34-day storage period.

Though the above relate to specifics of the present invention, this invention is not intended to be restricted thereby except insofar as these specifics appear in the claims.

What is claimed is:

1. A solution of organic isocyanate and a sufficient amount of organic compound bearing a

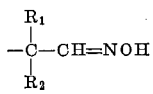

group to retard discoloration of the organic isocyanate where $R_1$ and $R_2$ are hydrogen or a 1–12 carbon atom alkyl group.

2. A solution of organic isocyanate and 0.005 to 5 percent by weight of the isocyanate of organic compound bearing a

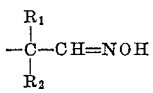

group where $R_1$ and $R_2$ are hydrogen or a 1–12 carbon atom alkyl group.

3. A solution of organic isocyanate and 0.01 to 1.0 percent by weight of the isocyanate of organic compound bearing a

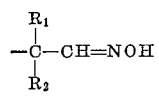

group where $R_1$ and $R_2$ are hydrogen or a 1–12 carbon atom alkyl group.

4. The solution of claim 1 wherein the organic diisocyanate is an organic polyisocyanate.

5. A solution of tolylene diisocyanate and a sufficient amount of acetaldoxime to retard discoloration of said diisocyanate.

6. A solution of tolylene diisocyanate and a sufficient amount of benzaldoxime to retard discoloration of said diisocyanate.

7. A solution of tolylene diisocyanate and a sufficient amount of n-heptaldoxime to retard discoloration of said diisocyanate.

8. A solution of tolylene diisocyanate and a sufficient amount of n-butyraldoxime to retard discoloration of said diisocyanate.

9. A solution of tolylene diisocyanate and a sufficient amount of iso-butyraldoxime to retard discoloration of said diisocyanate.

10. A solution of tolylene diisocyanate and a sufficient amount of 2,4-hexadienaldoxime to retard discoloration of said diisocyanate.

References Cited by the Examiner

UNITED STATES PATENTS 3,107,232   10/1963   Matlack _____ 252—400 X

CHARLES B. PARKER, *Primary Examiner.*

JOSEPH P. BRUST, D. R. MANANAND,
*Assistant Examiners.*